United States Patent [19]

Mylari

[11] 3,883,528
[45] May 13, 1975

[54] PREPARATION OF 2(ARYL)-AS-TRIAZINE-3,5(2H,4H)-DIONE COCCIDIOSTATS

[75] Inventor: Banavara L. Mylari, Waterford, Conn.

[73] Assignee: Pfizer Inc., New York, N.Y.

[22] Filed: Apr. 19, 1974

[21] Appl. No.: 462,198

[52] U.S. Cl. ....... 260/248 AS; 424/249; 260/243 B; 260/247.2 R; 260/247.5 R; 260/239.7
[51] Int. Cl. ............................................. C07d 55/10
[58] Field of Search .............................. 260/248 AS

[56] References Cited
UNITED STATES PATENTS
3,560,496  2/1971  Howes et al. ...................... 260/248

*Primary Examiner*—John M. Ford
*Attorney, Agent, or Firm*—Connolly and Hutz

[57] ABSTRACT

A process for the preparation of 2-(aryl)-as-triazine-3,5-(2H,4H)-dione coccidiostats by the decarboxylation of the corresponding 6-carboxylic acid comprising contacting said acid with at least a 0.1 molar proportion of thiourea, or a substituted thiourea.

7 Claims, No Drawings

PREPARATION OF 2(ARYL)-AS-TRIAZINE-3,5(2H,4H)-DIONE COCCIDIOSTATS

BACKGROUND OF THE INVENTION

This application relates to the field of chemical control of coccidiosis, a severe, wasting disease of young poultry caused by a protozoan infection. In particular, it relates to a novel process for the production of certain 2-substituted aryltriazine diones which have been found to be potent compounds in controlling coccidiosis.

A number of 2-substituted aryltriazine diones have been prepared by the thermal decarboxylation of the corresponding 6-carboxylic acids. The thermal decarboxylation is generally effected by heating the triazine carboxylic acid precursors (prepared by the method of Slouka, Monatsh. Chem. 96: 134–137, 1965) to temperatures above their melting points. The melting points of these acids are generally in the range of 250°–300°C., but some melt above 300°C. As a result of these high melting points, the pyrolysis reaction affords poor yields and is usually characterized by the production of dark, tarry by-products of unknown composition.

Thermal decarboxylation is also unsuitable for products which are thermally labile as are many of the desired compounds of this invention.

The prior art teaches that decarboxylation of 2-(aryl)-as-triazine-3,5(2H,4H)-dione-6-carboxylic acids may also be brought about by mercaptocarboxylic acids. That process, however, will afford less than optimum yields in those cases in which substituents are present in the precursor that are not inert to acidic reagents. Such moieties include allyl, which may be isomerized to the corresponding propenyl moiety and alcohols, which may react adversely by various paths to form esters, ethers, dehydrated by-products, etc. Furthermore, the mercaptocarboxylic acids used in that process are relatively expensive reagents. Additionally, they have quite offensive odors, reminiscent of hydrogen sulfide, which make them unpleasant to handle.

SUMMARY OF THE INVENTION

For the above reasons it was considered highly desirable to develop a means of decarboxylating the 6-carboxylic acid precursors to produce the 2-(aryl)-as-triazine-3,5(2H,4H)-diones at substantially lower temperatures employing relatively odor-free reagents devoid of acidic functional groups.

The present invention comprises a process for the preparation of 2-(aryl)-as-triazine-3,5(2H,4H)-dione coccidiostats by contacting the corresponding triazinedione-6-carboxylic acid with at least 0.1 molar proportion of a reagent of the formula

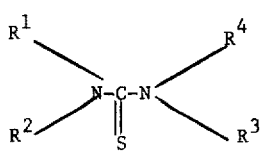

at a temperature of from about 120°–220°C. until reaction is substantially complete, wherein $R^1$, $R^2$, $R^3$ and $R^4$ are each selected from the group consisting of hydrogen, amino, lower alkylamino, lower alkyl and phenyl, with the proviso that only up to one of $R^1$, $R^2$, $R^3$ and $R^4$ is amino or lower alkylamino and that when one of $R^1$, $R^2$, $R^3$ and $R^4$ is amino or lower alkylamino, the remaining substituents are each hydrogen or lower alkyl, and with the further proviso that only up to two of $R^1$, $R^2$, $R^3$ and $R^4$ may be phenyl and when there are two such phenyl substituents, at least one of the remaining substituents is hydrogen.

DETAILED DESCRIPTION OF THE INVENTION

The 2-(aryl-as-triazine-3,5(2H,4H)-diones useful as coccidiostats are prepared by decarboxylation of the corresponding 6-carboxy derivatives by reaction with a sulfur-containing reagent of the above formula. The requisite 6-carboxy acid derivatives are obtained by acid hydrolysis of the corresponding cyano compounds which are, in turn, prepared according to the procedure of Slouka, Monatsh. Chem. 94, 258–262 (1963). This method comprises reaction of the appropriate phenyl diazonium salt with cyanoacetylurethan to provide the corresponding phenylhydrazono-cyanoacetylurethan which, under the influence of alkali or sodium acetate-acetic acid or ammonium acetate-acetic acid, produces the 6-cyano compound which is hydrolyzed to the carboxy acid under acid or alkaline conditions. Carboxy acids useful in this reaction are numerous. One class of such compounds (Structure I,), preferred because it affords coccidiostats of substantial value (Structure II), is disclosed in copending application Ser. No. 381,062, filed July 20, 1973 and assigned to the same assignee as the present case.

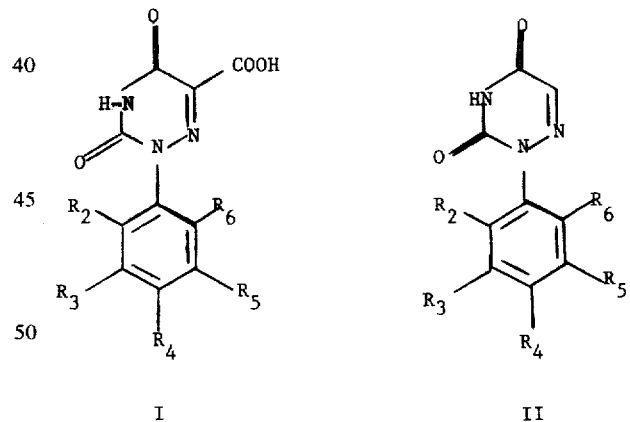

I                  II

Preferred compounds of Structures I and II include those wherein each of $R_2$ and $R_6$ is hydrogen, fluoro, chloro, cyano or methyl, with the proviso that at least one of $R_2$ and $R_6$ is hydrogen or fluoro;

each of $R_3$ and $R_5$ is selected from a first sub-group consisting of hydrogen, cyano, trifluoromethyl, halogen and lower alkyl; a second sub-group consisting of lower alkoxy and lower alkylthio; or a third sub-group consisting of nitro and thiocyanato;

R₄ is —NR₇R₈, lower alkanoyl, lower alkylsulfonyl, SO₂NRR₁;

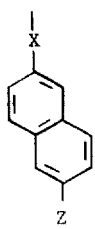 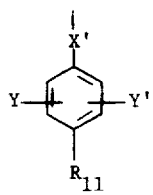 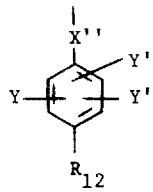

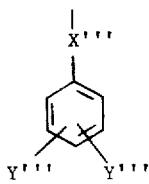 or —CH₂—NR₁₃R₁₄;

with the proviso that when R₄ is SO₂NRR₁ or lower alkanoyl, at least one of R₃ and R₅ is other than hydrogen;

R is selected from the group consisting of methyl, ethyl, phenyl, benzyl, allyl, propargyl and p-chlorophenyl;

R₁ is selected from the group consisting of methyl, ethyl, allyl and propargyl;

R and R₁ when taken together with the nitrogen to which they are attached are selected from the group consisting of pyrrolo, pyrrolino, pyrrolidino, piperidino, N-(lower alkyl)piperazino, hexamethyleneimino, 3,4-dichloropiperidino, thiazolidino, and Δ³-tetrahydropyridino and piperazino;

each of R₇ and R₈ is selected from the group consisting of lower alkyl of from 1 to 4 carbon atoms; R₇ and R₈ when taken together with the nitrogen atom to which they are attached are selected from the group consisting of pyrrolo, pyrrolino, pyrrolidino, piperidino, N-(lower alkyl)piperazino, hexamethyleneimino, thiazolidino, Δ³-tetrahydropyridino and piperazino;

X''' is selected from the group consisting of oxygen, sulfur, $\rangle$C=O, —NH, —S—O, —SO₂—, and —CHOH—;

Y''' is hydrogen, nitro, cyano, halogen, lower alkyl, or lower alkoxy;

provided that where R₃ or R₅ is methyl or chloro and X''' is sulfur, —SO₂—, or $\rangle$C=O, then R₄ is other than

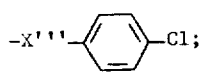

R₁₁ is hydrogen, halogen, lower alkylthio, lower alkylsulfinyl, lower alkylsulfonyl, lower alkoxy, trifluoromethyl or nitro;

R₁₂ is lower alkylthio, lower alkylsulfinyl, lower alkylsulfonyl, trifluoromethyl, lower alkanoyl or SO₂NR₁₅R₁₆ wherein R₁₃ and R₁₄ taken together with the nitrogen to which they are attached complete a morpholino, thiomorpholino, or thiazolidino ring;

R₁₅ is hydrogen, lower alkyl, propargyl, allyl, hydroxyethyl, acetoxyethyl, β-methylthioethyl, β-methoxyethyl, or 3-(2-methoxyethoxy)propyl;

R₁₆ is hydrogen, lower alkyl, propargyl, allyl, hydroxyethyl or acetoxyethyl;

R₁₅ and R₁₆ when taken together with the nitrogen to which they are attached are pyrrolino, pyrrolidino, morpholino, thiomorpholino, N-(lower alkyl)-piperazino, thiazolidino, Δ³-tetrahydropyridino or piperazino;

Z is hydrogen, lower alkylthio, or halogen;

Y, Y' and Y'' are each hydrogen, halogen, lower alkyl, or trifluoromethyl;

X is oxygen, sulfur, or —OCH₂—;

X' is —OCH₂—, —SCH₂—, —SOCH₂—, —SO₂CH₂—, or —CH₂—, —OCH₂—CO—,

X'' is oxygen, sulfur, SO, SO₂, $\rangle$C=O, or —CHOH—.

In the expressions "lower alkyl," "lower alkylamino," "lower alkoxy," "lower alkylthio," "lower alkylsulfinyl" and "lower alkylsulfonyl," the word "lower" is used to designate a carbon atom content of from about 1 to 4 carbon atoms. The expression "lower alkanoyl" is intended to embrace an alkanoyl moiety having from 1 to 5 carbon atoms, i.e., formyl, having one carbon atom, is included in the term "lower alkanoyl."

Any of the sulfur-containing reagents of the formula

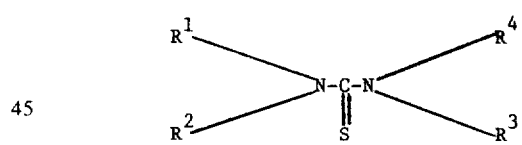

in which R¹, R², R³ and R⁴ are each selected from the group consisting of hydrogen, amino, lower alkylamino, lower alkyl and phenyl, with the proviso that only up to one of R¹, R², R³ and R⁴ is amino or lower alkylamino and that when one of R¹, R², R³ and R⁴ is amino or lower alkylamino, the remaining substituents are each hydrogen or lower alkyl, and with the further proviso that only up to two of R¹, R², R³ and R⁴ may be phenyl and when there are two such phenyl substituents, at least one of the remaining substituents is hydrogen, can be used in the process of this invention. More particularly preferred are compounds of the above structure in which at least one of R¹, R², R³ and R⁴ is hydrogen. Specific examples include thiourea, N-methylthiourea, N,N-dimethylthiourea, N,N'-dimethylthiourea, N,N,N'-trimethylthiourea, thiosemicarbazide, 1-methylthiosemicarbazide, 1,4-dimethyl thiosemicarbazide, N-phenylthiourea and N,N'-diphenylthiourea. However, as those skilled in the art will recognize, congeners of the above formula would also be expected to give satisfactory results. Examples of such congeners include compounds of the structures

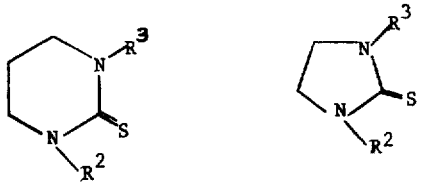

in which $R^2$ and $R^3$ are each hydrogen or lower alkyl. Of course, thiourea is especially preferred because of its lower cost and ease of availability.

The molar ratio of reactants is not critical, and can range from at least 0.1 molar proportion up to a large excess of the sulfur-containing reagent. In general, molar proportions of

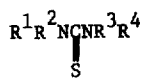

to triazinedione-6-carboxylic acid of from about 0.1:1 to about 10:1 are preferred.

The process, in many cases, may be carried out in the absence of solvent. However, in those cases where high melting reactants are involved, or where otherwise desired, a reaction-inert solvent of boiling point above 120° C. at atmospheric pressure may be additionally employed, i.e. a solvent free of adverse effect on the reactants and product under the reaction conditions employed. Such solvents include, for example, dialkyl ethers of alkylene glycols and glycol diethers, such as diethylene glycol dimethyl ether, ethylene glycol dibutyl ether and the like, as well as aromatic solvents, such as xylene, naphthalene, ethyl benzene, cymene, phenyl ether and the like.

In general, temperatures ranging from about 120° up to about 200° C. are favored. Higher temperatures or lower temperatures can, of course, be used but appear to offer no advantages. Temperatures of 130° C. and higher will generally be used to reduce the reaction time to a period of about 0.5 to 8 hours. Upon completion of the reaction, the product may be recovered by various methods which will be apparent to those skilled in the art. According to one procedure, the reaction mixture is decolorized, if desired; the pH is adjusted to the range of from about 3 to about 5; and the mixture is cooled to precipitate the product. Alternatively, the reaction mixture is simply poured into water and the precipitated product is collected. The product thus obtained is purified by methods known to those skilled in the art as, for example, by recrystallization from appropriate solvents, by chromatography on a suitable adsorbent, or by a combination of these methods.

The present agents may be orally administered to poultry in a suitable carrier therefor. It is generally convenient and, therefore, preferred to add the agents to the poultry feed so that a therapeutic dosage of the agent is ingested with the daily poultry ration. The agent may be added directly to the feed, as such, or in the form of a premix or concentrate. A premix or concentrate of therapeutic agent in a carrier is commonly employed for the inclusion of the agent in the feed. Suitable carriers are liquid or solid, as desired, such as water, various meals; for example, soybean oil meal, linseed oil meal, corncob meal, and mineral mixes such as are commonly employed in poultry feeds. A particularly effective carrier is the poultry feed itself; that is, a small portion of poultry feed. The carrier facilitates uniform distribution of the active materials in the finished feed with which the premix is blended. This is important because only small portions of the present potent agents are required. It is important that the compound be thoroughly blended into the premix and, subsequently, the feed. In this respect, the agent may be dispersed or dissolved in a suitable oily vehicle such as soybean oil, corn oil, cottonseed oil, and the like, or in a volatile organic solvent and then blended with the carrier. It will be appreciated that the proportions of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacturer with proteinaceous carriers such as soybean oil meal and other meals, as described above, to produce concentrated supplements which are suitable for direct feeding to poultry. In such instances, the poultry is permitted to consume the usual diet. Alternatively, such concentrated supplements may be added directly to the poultry feed to produce a nutritionally-balanced, finished feed containing a therapeutically-effective level of one or more of the compounds of this invention. The mixtures are thoroughly blended by standard procedures, such as in a twin shell blender, to ensure homogeneity. The finished poultry feed should contain roughly between 50 and 80 percent of grains, between 0 and 10 percent animal protein, between 5 and 30 percent vegetable protein, between 2 and 4 percent minerals, together with supplemental vitaminaceous sources.

It will, of course, be obvious to those skilled in the art that the use levels of the compounds described herein will vary under different circumstances. Continuous low-level medication, during the growing period, that is, during the first 8 to 12 weeks for chickens, is an effective prophylactic measure. In the treatment of established infections, higher levels may be necessary to overcome the infection.

The present compounds may be employed at substantially low levels in feeds for the prevention or treatment of coccidiosis. Generally, the feed compositions of the present invention comprise a minor amount of the 2-aryl-as-triazine compounds of this invention and a major amount of a nutritionally balanced feed, as described above. Feed compositions containing as little as 0.0015 percent of the present agent are found to effectively combat coccidiosis. Large amounts of the agent, up to 0.1 percent and larger, may also be employed. Of course, concentrations of less than 0.0015 percent provide some control of the infections. The concentration range favored in feed compositions is from about 0.0015 to about 0.05 percent. The preferred range is from about 0.0015 to about 0.025 percent of the ration. When administered by incorporation into the drinking water, preferably as an alkali metal or alkaline earth metal salt, the herein described compounds are used at levels one-half the dosage given for feeds.

The present feed compositions and supplements may also contain other effective therapeutic agents such as antibiotics to promote growth and general health of the poultry as well as sulfa compounds which may increase the effectiveness of the present coccidiostats.

The examples to follow are illustrative and in no way limit the scope of the appended claims.

EXAMPLE 1

In a 35 ml., round-bottomed flask, 2 grams of thiourea and 2 grams of 2-[3-chloro-4-(3-chlorophenoxy)phenyl]-as-triazine-3,5[2H,4H]-dione-6-carboxylic acid were combined and heated 4 hours in an oil bath at 190°C. A portion of the reaction mixture was triturated with water and filtered. The filter cake was found to contain none of the starting as-triazine-6-carboxylic acid by thin-layer chromatography using a benzene, ethyl acetate, acetic acid (67:33:5) system. The remaining reaction mixture was cooled to room temperature whereupon it solidified. After trituration with water it was allowed to stand overnight, then filtered, washed with water, aqueous NaHCO₃, water again and finally with pentane. The resulting product was crystallized from ethanol-water to yield 0.5 g. of 2-[3-chloro-4-(3-chlorophenoxy)phenyl]as-triazine-3,5[2H,4H]-dione, m.p. 151°–154° C. After dissolving a portion in 10 percent aqueous KOH, extraction with chloroform, and evaporation of the extract, the melting point was found to be 154°–156° C. The identity of the product was ascertained by comparison of infrared and mass spectrum data with comparable data obtained on an authentic sample.

EXAMPLE 2

A mixture of 43.6 g. 2-[3-chloro-5-methyl-4-(2-chlorophenoxy)phenyl]-as-triazine-3,5[2H,4H]-dione-6-carboxylic acid, 15 g. thiourea and 600 ml. diethyleneglycol dimethylether (diglyme) was heated at 160°–165° C. for 2 hours. The resulting reaction mixture was cooled to room temperature and poured into an ice-water mixture (500 g. of each). The precipitated solid was collected by filtration and air-dried, m.p. 181°–183° C. It was identified as 2-[3-chloro-5-methyl-4-(2-chlorophenoxy)phenyl]-as-triazine-3,5[2H,4H]-dione by comparison with an authentic sample.

EXAMPLES 3–8

By use of the procedure described in Example 2 the following additional examples were carried out. The heating period for each was approximately two hours.

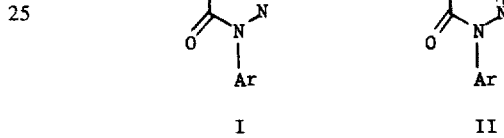

I    II

EXAMPLE 3

| I(Ar=) | Reagent | Solvent | Reaction Temp.,°C. | II, M.P. °C. |
|---|---|---|---|---|
| [3-chloro-4-(3-chlorophenoxy)phenyl] (49.4 g.) | NH₂CNH₂ ‖ S (8 g.) | Diglyme | 170 | 151–154 |

EXAMPLE 4

| I(Ar=) | Reagent | Solvent | Reaction Temp.,°C. | II, M.P. °C. |
|---|---|---|---|---|
| [3-methyl-5-chloro-4-(4-acetylphenoxy)phenyl] (2.2 g.) | CH₃NHCNHCH₃ ‖ S (0.2 g.) | Diglyme | 165 | 202–203 |

EXAMPLE 5

| I(Ar=) | Reagent | Solvent | Reaction Temp.,°C. | II, M.P. °C. |
|---|---|---|---|---|
| [3-methyl-5-chloro-4-(4-acetylphenoxy)phenyl] (2.2 g.) | C₆H₅NHCNHC₆H₅ ‖ S (2.3 g.) | Diglyme | 160 | 202–203 |

EXAMPLE 6

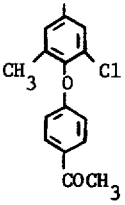

(2.2 g.)

EXAMPLE 7

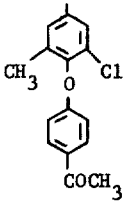

(2.2 g.)

EXAMPLE 8

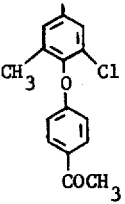

(2.2 g.)

EXAMPLE 9

Following the procedure of Example 2 but using N,N,N'-trimethyl thiourea as reagent, 2-[3-chloro-4-(3-chlorophenoxy)phenyl]-as-triazine-3,5-[2H,4H]-dione is prepared by decarboxylation of the corresponding 6-carboxylic acid compound.

EXAMPLE 10

Following the procedure of Example 2 but using tetramethyl thiourea as reagent, 2-[3-chloro-4-(3-chlorophenoxy)phenyl]-as-triazine-3,5[2H,4H]-dione is prepared from the corresponding 6-carboxylic acid compound using dibutyl cellosolve as solvent.

EXAMPLE 11

Following the procedure of Example 2, 2-[3-chloro-5-methyl-4-(2-chloro-4-N-ethyl,N-methyl sulfamoylphenoxy)phenyl]-as-triazine-3,5[2H,4H]-dione is prepared from the corresponding 6-carboxylic acid compound using xylene as solvent.

EXAMPLES 12-23

Following the procedures of Examples 2-11, the products (IV) are obtained starting with the triazine-6-carboxylic acids of formula III. In each of these examples thiourea is employed, and the reaction carried out in diglyme as solvent.

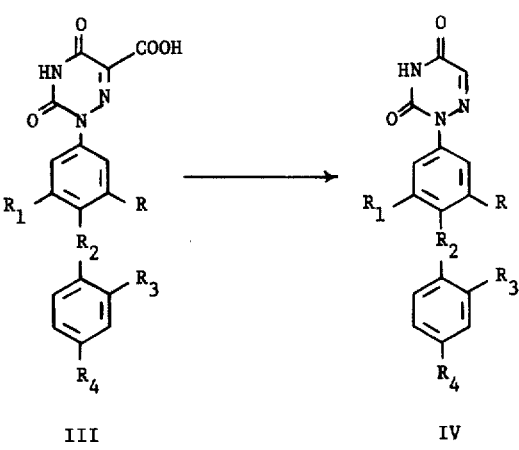

III            IV

| Example Number | R | $R_1$ | $R_2$ | $R_3$ | $R_4$ | Quantity of Triazine III, Grams | Quantity of Thiourea, Grams |
|---|---|---|---|---|---|---|---|
| 12 | $CH_3$ | $CH_3$ | S | H | Cl | 150 | 28 |
| 13 | Cl | H | C=O | H | Cl | 3.0 | 0.10 |
| 14 | Cl | H | O | H | Cl | 3.0 | 5.0 |
| 15 | Cl | H | O | H | Br | 11.0 | 0.50 |
| 16 | $CH_3$ | H | O | H | Br | 2.0 | 0.05 |
| 17 | Cl | H | O | $CH_2CH_3$ | H | 1.9 | 0.37 |
| 18 | $CH_3$ | Cl | S | H | Cl | 8.2 | 3.0 |
| 19 | $CH_3$ | Cl | C=O | H | Cl | 2.1 | 2.1 |
| 20 | Cl | H | O | H | I | 10.0 | 0.20 |
| 21 | $CF_3$ | H | O | $CH_3$ | Cl | 5.0 | 0.86 |
| 22 | Cl | H | O | Cl | Cl | 0.41 | 0.41 |
| 23 | $CH_3$ | $CH_3$ | S | H | Cl | 4.0 | 1.0 |

EXAMPLES 24-26

Following the procedures of Examples 2-10 but employing triazine carboxylic acids of the formula V, below, the products VI are obtained.

EXAMPLES 27-41

Following the procedure of Example 1, the following triazines are obtained from the corresponding triazine carboxylic acids employing thiourea as the decarboxylating reagent without additional solvent.

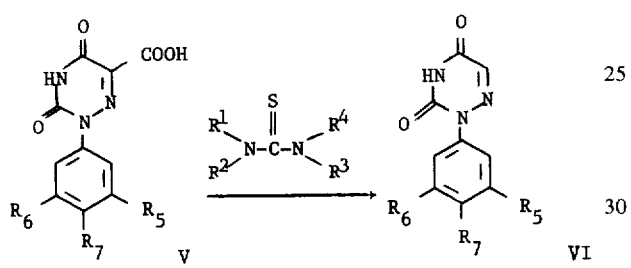

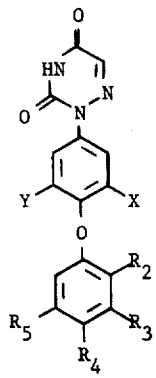

| Ex. Number | $R_5$ | $R_6$ | $R_7$ | Gram moles of V | Reagent Name | Reagent Gram moles | Moles Reagent / Mole V | Temp.°C | Time (hours) | Solvent |
|---|---|---|---|---|---|---|---|---|---|---|
| 24 | H | H | $NO_2$ | 0.23 | Thiosemicarbazide | 0.69 | 3:1 | 130 | 3 | Diglyne |
| 25 | COOH | H | H | 0.22 | N,N'-dimethylthiourea | 0.33 | 1:5:1 | 170 | 2 | Naphthalene |
| 26 | $CH_3$ | Cl | H | 0.20 | N,N-dimethylthiourea | 0.20 | 1:1 | 160 | 2 | Phenyl ether |

| Example Number | Triazine-6-COOH (grams) | Thiourea, grams | X | Y | $R_2$ | $R_3$ | $R_4$ | $R_5$ |
|---|---|---|---|---|---|---|---|---|
| 27 | 9.0 | 9.0 | Cl | H | H | H | $SCH_3$ | H |
| 28 | 4.6 | 4.0 | $CH_3$ | $CH_3$ | H | $CH_3$ | $SCH_3$ | H |
| 29 | 8.5 | 8.0 | $CH_3$ | $CH_3$ | H | H | $SCH_3$ | H |
| 30 | 30.0 | 30.0 | $CH_3$ | Cl | H | H | H | H |
| 31 | 36.5 | 36.0 | $CH_3$ | $CH_3$ | H | H | H | H |
| 32 | 14.3 | 15.0 | $CH_3$ | Cl | $CH_3$ | H | H | H |
| 33 | 8.0 | 8.0 | $CH_3$ | Cl | H | $CH_3$ | $SCH_3$ | H |
| 34 | 40.0 | 30.0 | $CH_3$ | Cl | Cl | H | H | H |
| 35 | 22.5 | 23.0 | Cl | H | $CH_3$ | $CH_3$ | H | H |
| 36 | 5.3 | 6.0 | $CH_3$ | $CH_3$ | H | H | $COCH_3$ | H |

| Example Number | Triazine-6-COOH (grams) | Thiourea, grams | X | Y | $R_2$ | $R_3$ | $R_4$ | $R_5$ |
|---|---|---|---|---|---|---|---|---|
| 37 | 205 | 200 | $CH_3$ | Cl | H | H | $COCH_3$ | H |
| 38 | 3.1 | 5.0 | $CH_3$ | Cl | H | $CH_3$ | $COCH_3$ | H |
| 39 | 20.0 | 15.0 | $CH_3$ | Cl | $C_2H_5$ | H | H | H |
| 40 | 6.0 | 6.0 | Cl | H | H | 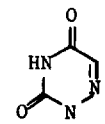 | —Br | H |
| | | | 2-[3-chloro-4-(6-bromo-2-naphthyloxy)-phenyl]-as-triazine-3,5[2H,4H]-dione | | | | | |
| 41 | 6.0 | 6.0 | Cl | H | H | $CH_3$ | $SCH_3$ | H |

EXAMPLES 42–86

Following the foregoing procedures, the compounds below are prepared.

| Example Number | X | Y | $R_2$ | $R_3$ | $R_5$ | $R_1$ | $R_1'$ |
|---|---|---|---|---|---|---|---|
| 42 | $CH_3$ | Cl | $CH_3$ | H | H | $CH_3$ | $CH_3$ |
| 43 | $CH_3$ | Cl | $CH_3$ | H | H | $R_1R_1'$ = | Morpholino |
| 44 | $CH_3$ | Cl | Cl | H | H | $CH_3$ | $CH_3$ |
| 45 | $CH_3$ | Cl | Cl | H | H | $C_2H_5$ | $C_2H_5$ |
| 46 | $CH_3$ | Cl | Cl | H | H | $R_1R_1'$ = | Morpholino |
| 47 | $CH_3$ | Cl | Cl | H | H | $CH_3$ | $C_2H_5$ |
| 48 | $CH_3$ | Cl | Cl | H | H | H | $-CH_2CH_2OCH_3$ |
| 49 | $CH_3$ | Cl | Cl | H | H | H | $-CH_2CH_2-CH_3$ |
| 50 | $CH_3$ | $CH_3$ | $CH_3$ | $CH_3$ | $CH_3$ | $C_2H_5$ | $C_2H_5$ |
| 51 | $CH_3$ | $CH_3$ | $CH_3$ | $CH_3$ | $CH_3$ | $CH_3$ | $CH_3$ |
| 52 | $CH_3$ | $CH_3$ | $CH_3$ | $CH_3$ | $CH_3$ | $CH_3$ | $C_2H_5$ |
| 53 | $CH_3$ | Cl | $CH_3$ | $CH_3$ | H | $C_2H_5$ | $C_2H_5$ |
| 54 | $CH_3$ | $CH_3$ | $CH_3$ | $CH_3$ | $CH_3$ | H | $-(CH_2)_2OCH_3$ |
| 55 | $CH_3$ | $CH_3$ | $CH_3$ | $CH_3$ | $CH_3$ | H | $-CH_2CH_2CH_3$ |
| 56 | $CH_3$ | $CH_3$ | $CH_3$ | $CH_3$ | $CH_3$ | $R_1R_1'$ = | Pyrrolino |
| 57 | $CH_3$ | $CH_3$ | $CH_3$ | $CH_3$ | $CH_3$ | $-CH_2CH_2CH_3$ | $-CH_2CH_2CH_3$ |
| 58 | $CH_3$ | $CH_3$ | $CH_3$ | $CH_3$ | $CH_3$ | H | 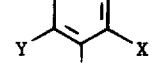 |
| 59 | $CH_3$ | Cl | Cl | H | H | H | 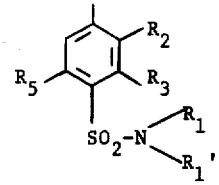 |
| 60 | $CH_3$ | Cl | Cl | H | H | $R_1R_1'$ = | Pyrrolino |

| Example Number | X | Y | $R_2$ | $R_3$ | $R_5$ | $R_1$ | $R_1'$ |
|---|---|---|---|---|---|---|---|
| 61 | $CH_3$ | $CH_3$ | $CH_3$ | $CH_3$ | $CH_3$ | H | $-CH_2CH_2SCH_3$ |
| 62 | $CH_3$ | Cl | Cl | H | H | H | $-CH_2CH_2SCH_3$ |
| 63 | $CH_3$ | Cl | Cl | H | H | $CH_3$ | $-CH_2-CH=CH_2$ |
| 64 | $CH_3$ | Cl | $CH_3$ | $CH_3$ | $CH_3$ | H | $-CH_2-CH_2OCH_3$ |
| 65 | $CH_3$ | Cl | $CH_3$ | $CH_3$ | $CH_3$ | H | $-CH_2CH_2OH$ |
| 66 | $CH_3$ | Cl | $CH_3$ | $CH_3$ | $CH_3$ | $C_2H_5$ | $C_2H_5$ |
| 67 | $CH_3$ | Cl | $CH_3$ | $CH_3$ | $CH_3$ | H | $-CH_2CH_2SCH_3$ |
| 68 | $CH_3$ | Cl | $CH_3$ | $CH_3$ | $CH_3$ | $CH_3$ | $C_2H_5$ |
| 69 | $CH_3$ | Cl | $CH_3$ | $CH_3$ | $CH_3$ | $CH_3$ | $-CH_2CH=CH_2$ |
| 70 | $CH_3$ | Cl | $CH_3$ | $CH_3$ | $CH_3$ | $R_1R_1'$ = | Pyrrolino |
| 71 | $CH_3$ | Cl | $CH_3$ | $CH_3$ | $CH_3$ | H | $-CH_2CH_2CH_3$ |
| 72 | $CH_3$ | Cl | $CH_3$ | $CH_3$ | $CH_3$ | H | $C_2H_5$ |
| 73 | $CH_3$ | Cl | $CH_3$ | $CH_3$ | $CH_3$ | $CH_3$ | $CH_3$ |
| 74 | $CH_3$ | Cl | $CH_3$ | $CH_3$ | $CH_3$ | H | H |
| 75 | $CH_3$ | Cl | $CH_3$ | $CH_3$ | $CH_3$ | $CH_3$ | H |
| 76 | $CH_3$ | Cl | $CH_3$ | $CH_3$ | $CH_3$ | H | 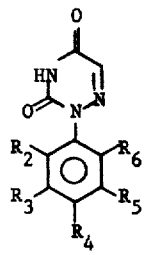 |
| 77 | $CH_3$ | Cl | $CH_3$ | $CH_3$ | $CH_3$ | H | $-CH_2CH_2OCOCH_3$ |
| 78 | $CH_3$ | Cl | Cl | H | H | H | $-CH_2-CH_2OH$ |
| 79 | $CH_3$ | Cl | Cl | H | H | H | $-CH(CH_3)_2$ |
| 80 | $CH_3$ | Cl | Cl | H | H | H | $-CH_2CH_2SO_2CH_3$ |
| 81 | $CH_3$ | Cl | Cl | H | H | H | $CH_2CH_2OCOCH_3$ |
| 82 | $CH_3$ | Cl | $CH_3$ | $CH_3$ | $CH_3$ | H | $-CH(CH_3)_2$ |
| 83 | $CH_3$ | $CH_3$ | $CH_3$ | $CH_3$ | $CH_3$ | $CH_3$ | $-CH_2-CH=CH_2$ |
| 84 | $CH_3$ | $CH_3$ | $CH_3$ | $CH_3$ | $CH_3$ | H | $-CH_2-CH_2OH$ |
| 85 | $CH_3$ | $CH_3$ | $CH_3$ | $CH_3$ | $CH_3$ | H | $-CH_2CH_2SO_2CH_3$ |
| 86 | $CH_3$ | $CH_3$ | $CH_3$ | $CH_3$ | $CH_3$ | H | $-CH_2-CH_2OCOCH_3$ |

EXAMPLES 87–91

In like manner, the following compounds are prepared from appropriate reactants:

| Example Number | $R_2$ | $R_3$ | $R_4$ | $R_5$ | $R_6$ |
|---|---|---|---|---|---|
| 87 | H | $CH_3$ | $-O-(4-SO_2CH_3-C_6H_4)$ | H | H |
| 88 | H | $CH_3$ | $-O-(3-CH_3-4-SO_2CH_3-C_6H_3)$ | H | H |
| 89 | H | Cl | $-O-(3-CH_3-4-SO_2CH_3-C_6H_3)$ | H | H |
| 90 | H | Cl | $-O-(3-CH_3-4-SO_2CH_3-C_6H_3)$ | $CH_3$ | H |
| 91 | H | $CH_3$ | $-O-(3-CH_3-4-SO_2CH_3-C_6H_3)$ | $CH_3$ | H |

| Ex. No. | $R_2$ | $R_3$ | $R_4$ | $R_5$ | $R_6$ |
|---|---|---|---|---|---|
| 87 | H | $CH_3$ | $-O-(4-SO_2CH_3-C_6H_4)$ | H | H |
| 88 | H | $CH_3$ | $-O-(3-CH_3-4-SO_2C-H_3-C_6H_3)$ | H | H |
| 89 | H | Cl | $-O-(3-CH_3-4-SO_2C-H_3-C_6H_3)$ | H | H |
| 90 | H | Cl | $-O-(3-CH_3-4-SO_2C-H_3-C_6H_3)$ | $CH_3$ | H |
| 91 | H | $CH_3$ | $-O-(3-CH_3-4-SO_2C-H_3-C_6H_3)$ | $CH_3$ | H |

What is claimed is:

1. A process for the preparation of 2-(aryl)-as-triazine-3,5(2H,4H)dione coccidiostats which comprises contacting the corresponding triazinedione-6-carboxylic acid with at least 0.1 molar proportion of a reagent of the formula

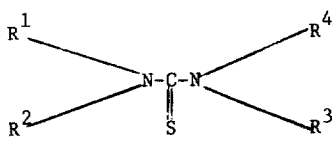

at a temperature of from about 120° to 220°C. until reaction is substantially complete,
wherein $R^1$, $R^2$, $R^3$ and $R^4$ are each selected from the group consisting of hydrogen, amino, lower alkyl-amino, lower alkyl, and phenyl, with the proviso that only up to one of $R^1$, $R^2$, $R^3$, and $R^4$ is amino or lower alkylamino and that when one of $R^1$, $R^2$, $R^3$ and $R^4$ is amino or lower alkylamino, the remaining substituents are each hydrogen or lower alkyl, and with the further proviso that only up to two of $R^1$, $R^2$, $R^3$ and $R^4$ may be phenyl and when there are two such phenyl substituents, at least one of the remaining substituents is hydrogen.

2. The process of claim 1 wherein the molar ratio of said reagent to said triazinedione-6-carboxylic acid is from about 0.1 to 10.

3. The process of claim 1 wherein said contacting is carried out in a reaction-inert solvent of boiling point greater than about 120°C.

4. The process of claim 3 wherein said solvent is diethylene glycol dimethylether.

5. The process of claim 1 wherein said reagent is thiourea.

6. The process of claim 1 wherein said coccidiostat is 2-[3-chloro-5-methyl-4-(2-chlorophenoxy)phenyl]-as-triazine-3,5(2H,4H)-dione.

7. The process of claim 1 wherein said coccidiostat is 2-[3-chloro-5-methyl-4-(2-chloro-4-N-ethyl,N-methyl sulfamoylphenoxy)phenyl]-as-triazine-3,5(2H,4H)-dione.

* * * * *